United States Patent Office 3,817,931
Patented June 18, 1974

---

3,817,931
PROCESS FOR THE PRODUCTION OF POLYESTERS
Eric Howard Brooks and Arthur Morris, Runcorn, England, assignors to Imperial Chemical Industries Limited, London, England
No Drawing. Filed Jan. 6, 1972, Ser. No. 215,941
Int. Cl. C08g 17/015
U.S. Cl. 260—75 R     5 Claims

ABSTRACT OF THE DISCLOSURE

Polyesters are prepared by polycondensation of a bis (dihydric alcohol) ester of an aromatic dicarboxylic acid using a defined catalyst which is produced by reacting a hydroxyl bearing support material (e.g. alumina) with a metal compound. The catalyst may be granular and in this form is filterable from the product polymer.

---

This invention relates to the production of highly polymeric polyesters of aromatic dicarboxylic acids and dihydric alcohols.

Highly polymeric polyesters of aromatic dicarboxylic acids and dihydric alcohols are known to be useful thermoplastic materials capable of conversion of films, fibres and moulded articles having a desirable combination of physical and chemical properties. Examples of such polyesters are those prepared, for example, from terephthalic acid or 1,2-di (p-carboxyphenoxy) ethane and ethylene glycol or butane-1,4-diol or 1,4 - dihydroxymethylcyclohexane. Many processes have been proposed for the production of these polyesters but in general they proceed via the formation of the bis(dihydric alcohol) ester of the aromatic dicarboxylic acid and the polycondensation of this intermediate to highly polymeric polyester with loss of dihydric alcohol by heating in a molten state under reduced pressure. The bis ester may be formed by reaction of a dialkyl ester of aromatic dicarboxylic acid with a dihydric alcohol (generally referred to as transesterification). Alternatively, the bis ester may be formed by direct esterification of the dicarboxylic acid and the dihydric alcohol. So as not to modify, dilute or lose the highly desirable characteristic properties of the highly polymeric polyesters of dihydric alcohols and aromatic dicarboxylic acids, it is usually preferred that the polycondensable material consists substantially entirely of one or more bis(dihydric alcohol) esters of aromatic dicarboxylic acids. However, the presence of a small concentration of other polycondensable material may be tolerated if desired, for example to improve dyeability. For example up to about 5 mole percent of the dihydric alcohol moiety in the bis ester or esters may be replaced by at least one other polycondensable dihydroxyl compound and/or to about 5 mole percent of the aromatic dicarboxylic acid moiety may be replaced by at least one other dicarboxylic acid. Up to about 5 mole percent of the polycondensable mixture may also consist of other mono- or polyfunctional material, if desired, e.g. monohydric alcohols and/or their esters with the dicarboxylic acids, amines and/or diamines and/or their amides with the dicarboxylic acids, aminoalcohols and/or their condensation products with the dicarboxylic acids, and/or aminoacids, hydroxyl acids, lactams and/or lactones and/or their condensation products with the dicarboxylic acids and/or dihydric alcohols. However, it is usually preferred that at least 85 mole percent, and preferably at least 95 mole percent of the polycondensable mixture consists of bis(dihydric alcohol) ester of aromatic dicarboxylic acid.

It is the usual procedure to catalyse these processes, especially the polycondensation process, using metal compounds of various types.

We have now found that there are advantages to be gained by attaching the metal to an inert substrate. These advantages include modification of the catalytic properties of the metal and different product quality. Thus titanium based catalysts while normally very active, often give a yellow product. When titanium compounds are used in our process, a less coloured product is obtained. A further advantage of our catalysts is that they are insoluble in the polycondensation reaction components and if of large particle size, can be retained as a fixed catalyst bed, through which reactants and products are passed.

The catalyst for our process are considered to be characterised by structures of type I $$Z—X_m—M—L_{n-m} \qquad I$$

where

Z represents the surface of an inorganic substrate material;
M represents a metal atom of valency $n$;
X is a direct link or a divalent group, especially —O—;
$m$ is an integer from 1 to $n-1$; and
L represents other ligands which satisfy remaining valency requirements of M.

The inorganic substrate material is essentially inert, apart from surface activity necessary to bond the catalytic species. Examples of suitable materials are silica, alumina, magnesia, aluminosilicates, boron phosphate, zirconia, mixtures thereof and related materials.

M is preferably a metal of Groups IIA to VIII or Groups IIB to VB. Germanium is considered to be a metal for the purpose of the present specification. Magnesium, calcium, gemanium, tin, antimony, zinc, cadmium, titanium, zirconium, vanadium, niobium, chromium, molybdenum manganese iron, cobalt, nickel, cerium and lanthanum have all proved effective catalysts in this process when supported often, metals which unsupported, give coloured polymers, are found to give colourless polymers when the supported catalyst is filtered off from the polymer melt.

Ligands L are preferably hydroxyl, oxyhydrocarbyl, hydrocarbyl and hydroxyl substituted derivatives of these last two, or halide. Of these, halide is undesirable where the process is to be carried out in a metal autoclave, when corrosion may be a problem, but in glass apparatus halide is not so objectionable. Hydrocarbyl ligands are inevitably converted into oxyhydrocarbyl or hydroxyl substituted derivatives thereof, during the polycondensation and may be reacted with alcohols to bring about this conversion before the polycondensation reaction begins. Halide ligands may be exchanged similarly. Preferred alcohols for this purpose are lower alkane mono-ols or diols, such as methanol, ethanol and ethylene glycol.

The catalysts for our process may be prepared by a variety of reactions, typical starting materials having the following structures:

| Z—OH | Z—OR | Z—Y | Z—H |
|------|------|-----|-----|
| II | III | IV | V | where

Z again represents the substrates surface;
R is hydrocarbyl, especially lower alkyl;
Y is halogen.

These starting materials have a plurality of reactive groups attached to the surface only. Such materials are capable of reacting with, say, a transition metal hydrocarbyl complex, but the bulk of the substrate is chemically inert, and serves as a support. The support material is conveniently activated by heating at 200 to 700° C. before use.

In a first reaction for the preparation of suitable catalysts for our process, starting material II is contacted with a hydrolyzable compound of the desired metal, M. If the metal compound is unstable in the presence of water it will normally be capable of reaction with the hydroxyl groups of the surface of the substrate. Metal compounds having halide, oxyhydrocarbyl or organometallic ligands are generally suitable, the last mentioned having one or more metal-carbon bonds of the π-, σ- or of intermediate types.

Examples of suitable metal halides are titanium, zirconium or hafnium tetrachloride, or tetrabromide, vanadium tetrachloride or oxychloride, stannous or stannic chloride or bromide, antimony trichloride, and germanium tetrachloride or bromide.

Examples of suitable metal oxyhydrocarbyl compounds are germanium titanium, zirconium or hafnium alkoxides, such as isopropoxides and glycoloxides.

Examples of suitable organo-metallic compounds are tetra (π-allyl) titanium, zirconium, or hafnium, tetra(π-methallyl) titanium or zirconium, tetra (benzyl) zirconium or titanium, tetra 1-(methylene-1-naphthyl)-zirconium or titanium, tetra (trimethylsilylmethyl) zirconium di (cyclopentadienyl) manganese di(alkyl) zinc, and trialkyls of aluminum.

Metal compounds containing mixed ligands of the type referred to may also be used, e.g. tri (π-allyl) zirconium or titanium chloride bromide or iodide, and equivalent π-methallyl or benzyl compounds.

It is not essential to start preparation of the catalyst with the preformed support material, as this may be formed after introduction of the metal. For example a trialkoxy silane in which the fourth bond is to a metal atom may be hydrolyzed to form a silica-like material, with a high concentration of metal.

Reaction occurs with one or more hydroxylic groups of the substrate to form one or more bonds X; in all of the instances so far mentioned X is —O—. The relative amounts of the substrate and metal compound should be chosen so that most of the hydroxyl groups are reacted, each metal atom being linked to the substrate by from 1 to $n-1$ bonds of the —O— type. The number of hydroxyl groups on the surface of the substrate may be determined by treatment with methyl magnesium bromide and measurement of the volume of methane liberated. Alternatively, where the metal compound is coloured, a solution thereof may be added to a suspension of the substrate until the colour of the metal compound is seen permanently in the solution, indicating that no more will react.

Where an organometallic compound is used, this solution method is preferred for good control of the reaction. Low temperatures are desirable (below 0° C.) to avoid premature decomposition of the organometallic compound. It is also desirable to free the substrate from adsorbed water, e.g. by heating, leaving only the surface hydroxyl groups. The solvent and suspending medium should be free from water when organometallic compounds are used.

Some metal compounds may be reacted (with the hydroxyl group of the substrate) in the vapour phase. This is conveniently achieved by carrying the vapour over a heated substrate material with an inert gas, e.g. nitrogen. This method is suitable for some transition metal halides, e.g. titanium, and also for germanium tetrachloride.

Another convenient method is to contact an ethylene glycol slurry of the metal compound with a heated substrate, e.g. silica or alumina.

Similar techniques to those described above may be used to prepare catalysts from starting materials of structures III and IV, which may themselves be prepared from II by reaction with other alcohols (including diols) or halogen. Materials according to structure V may be prepared by pyrolysis of structure III, and then contacted with, for example, germanium tetrahalides to give a direct link to the germanium atom.

Before use as catalysts in the process of our invention, the catalytic compositions prepared by the above procedures may be further reacted with alcohols or water to convert all ligands L to oxyhydrocarbyl or hydroxyl ligands. This is especially desirable where halogens are present, which would cause corrosion in metal autoclaves. Catalysts so prepared have the structure

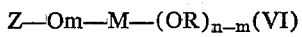

$$Z—O_m—M—(OR)_{n-m} \quad (VI)$$

where Z m and n have the meaning given above and R is hydrogen or a lower alkyl group or a hydroxy substituted derivative thereof containing from 1 to 8 carbon atoms.

Examples of suitable alcohols are methanol, ethanol or isopropanol.

Instead of, or in addition to this treatment with the above monohydric alcohols, dihydric alcohols especially ethylene glycol, may be used.

In accordance with our invention, these catalysts may be used to aid the production of polymers of polycondensable mixtures consisting mainly or entirely or bis-(dihydric alcohol) esters of aromatic dicarboxylic acids.

The invention is especially applicable to the production of polyesters wherein the dicarboxylic acid is at least 80 mole percent terephthalic acid, but other aromatic acids may also be used. Examples of other aromatic dicarboxylic acids include isophthalic acid and dinuclear dicarboxylic acids, e.g. represented by the structure VII.

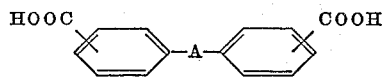

VII where A is a direct link or a divalent atom or a group which is free of Zerewitinoff hydrogen atoms, e.g. —O—, $CR^1R^2$, —S—, —SO—, —CO—, —$SO_2$—, —N hydrocarbyl) and —O(CH_2)_nO— where $R^1$ and $R^2$ are each selected from hydrogen atoms and monovalent hydrocarbon group, e.g. as in —$(CH_2)_5$—, and $n$ is a positive integer of at least 2. If desired, one or more of the hydrogen atoms attached to the nuclear carbon atoms of these mono- and dinuclear acids may be replaced by other monovalent atoms or groups inert in the reaction mixture, e.g. halogen atoms, nitro groups, hydrocarbyl, e.g. alkyl groups, and hydrocarbyloxy, e.g. alkoxy groups.

Examples of dihydric alcohols that may be used are α,ω-polymethylene glycols, especially those having the structure $HO(CH_2)_xOH$ where $x$ is from 2 to 10, branches aliphatic diols e.g. 3,3,5-trimethylhexane-1,6-diol and neopentyl glycol, and alicyclic diols, e.g. 1,4-di(hydroxymethyl) cyclohexane and 2,2,4,4-tetramethyl cyclobutane-1,3-diol. Ethylene glycol and butane-1,4-diol are preferred, especially the former.

One advantage of the present invention is that the catalytic composition is essentially insoluble in the monomer and polymer. Thus the catalyst may be filtered from melted polymer before subsequent processing. It is also convenient to compact the catalyst into particles or granules of the order of 0.5 to 50 mm. in diameter and to use them in this form to aid removal. A compacted particulate catalyst may be maintained as a fixed bed, and the polymer forming materials circulated or passed through the bed, in a batch or continuous process. Alumina is particularly suitable for this purpose because they can be formed into abrasion resistant particles.

The amount of catalyst used, calculated on the basis of weight of metal percent total weight of dimethyl ester of terephthalic acid processed (or equivalent if other acids are used) may be in the range 0.001 to 10% preferably 0.005 to 2%.

With the use of the catalyst in these concentrations, rapid reactions may be achieved. Moreover, with the use of many of the catalysts of our invention the clarity of the polyester melt has been observed to be better than that of high molecular weight polyesters obtained from many processes using conventional catalyst systems, e.g. based on metal acetates and metal oxides without stabilisers. Larger amounts of the catalyst may be used if desired.

One particular advantage of the present invention is that titanium compounds may be used. While this is true of simple titanium compounds, the products are undesirably coloured. Using the supported catalysts according to our process however substantial improvement in colour is obtained, while catalyst activity remains high.

Conventional reaction conditions may be used for the production of the bis glycol ester or oligomer and its subsequent polycondensation and other additives may be included before, during or after the reactions, e.g. for delustering, stabilising, pigmenting and/or otherwise modifying the high molecular weight polyester product.

The invention is now illustrated by the following Examples in which all parts are expressed as parts by weight.

EXAMPLE 1

(a) *Catalyst Preparation:* γ-Alumina, particle size 17–25 millimicrons (20 parts) was heated at 500° C. under nitrogen for 2 hours. It was cooled to room temperature under nitrogen, evacuated for 5 minutes and returned to atmospheric pressure under nitrogen.

The alumina substrate was suspended in toluene (100 parts) and stirred with a solution in a mixture of toluene (30 parts) and dekalin (120 parts) of tetra (benzyl) zirconium (3 parts).

After allowing to settle, the liquor was syringed off and the brownish supported zirconium-containing product was dried in vacuo. The dry material was treated with deoxygenated ethylene glycol (200 parts) with stirring.

(b) *Polycondensation:* 1500 parts of the bis(ethylene-glycol) ester of terephthalic acid, prepared by direct esterification (D.E. monomer) was introduced into a glass lined autoclave under nitrogen and the autoclave was heated to melt the contents. Phenyl(methyl)phosphinic acid (2 parts) was added followed by the glycol slurry of the catalyst prepared above. The polycondensation was then completed at 80° C. for 3 hours under 0.1 to 0.3 mm. mercury pressure.

EXAMPLE 2

(a) *Catalyst Preparation:* Silica (27 parts, "Manosil" particle size 15–20 millimicrons) was calcined in a furnace at 400°–500° C. for 3–5 hours in a stream of dry nitrogen. Titanium tetrachloride vapour in a stream of nitrogen, was passed over the active support at 300° C. for 2.5 hours followed by nitrogen alone for a period of 48 hours whilst allowing to cool to room temperature.

The supported catalyst was contacted under nitrogen with 100 mls. of absolute ethanol to hydrolyse the surface halogen and the resultant alkylated support was vacuum dried at 100° C.

A portion of the catalyst (22 parts) was refluxed and stirred in ethylene glycol (100 parts) for 3 hours, filtered, washed with ethanol and dried at 100° C. under vacuum. The catalyst contained 1.44% Ti.

(b) *Polycondensation:* A stainless steel autoclave was prepared for polycondensation.

Direct esterification monomer (600 parts) was introduced, followed by 1.668 parts of the catalyst prepared as in 2(a) above. The amount of titanium present was calculated as 0.005% by weight of titanium metal based on dimethyl terephthalate.

The autoclave was sealed, evacuated to 0.1 to 0.3 mm. mercury and heated to 280° C. for 1.5 hours. After cooling, the colourless product was found to have an intrinsic viscosity of 0.77.

(c) For comparison of the above supported catalyst with an unsupported catalyst, the procedure of Example 2(b) was repeated using titanium tetraisopropoxide (0.143 parts=0.005% weight Ti based on DMT). The resultant polymer was deep orange-yellow.

(d) For comparative purposes 1.668 grams of activated silica ("Manosil") was used as a polycondensation catalyst but no polymer was obtained after 1½ hours in a stainless steel vessel.

EXAMPLE 3

(a) *Catalyst Preparation:* Silica (30 parts, "Aerosil" size 15–20 millimicrons) was dried by heating to 300° C. in a stream of dry nitrogen for 2½ hours.

The residual surface hydroxyls were methylated by passing methanol vapour, carried in a stream of $N_2$, over the silica at 390° C. for 1½ hours. Excess methanol was purged with a dry nitrogen stream for 1 hour.

The furnace was then heated to 750° C. and the silica pumped at $10^{-2}$ mm. for 70 hours to leave —Si—H and some —Si—OH groups on the silica surface.

The silica so prepared was heated to 307° C. and contacted with germanium tetrachloride vapour, carried by nitrogen, for 2 hours. Excess germanium chloride was removed by purging with nitrogen.

Residual chlorine was removed by or alcoholysis of the silica with absolute ethanol (2×200 parts) leaving ethoxide groups on germanium in place of chlorine.

After filtering, the silica was dried and found to contain 0.58% Ge.

(b) *Polycondensation:* Polycondensation of 600 parts direct esterification monomer (NaOH catalyst) was carried out at 280° C. without stabiliser using as catalyst 11.5 parts of the support containing germanium (i.e. 0.067 parts). Polymer with intrinsic viscosity 0.64 and slight buff colour (due to catalyst granules which could be filtered from the melt) was obtained in 1½ hours.

EXAMPLE 4

(a) *Catalyst Preparation:* Graded silica (30 parts) in the size range 295–500μ was heated to 300° in a stream of $N_2$ for 2 hours to drive off adsorbed water. Residual surface hydroxyls were methylated by passing methanol vapour, carried in a stream of nitrogen, over the silica at 300° for 1½ hours. The methylated silica was then heated to 700° for 72 hours, to leave Si—H and some Si—OH groups on the surface.

The silica so prepared was heated to 300° and treated with germanium tetrachloride vapour using nitrogen as carrier gas for 1½ hours; excess $GeCl_4$ was purged out of the system both $N_2$ gas. Residual chlorine was removed by refluxing the silica for 2 hours with ethylene glycol, giving glycoloxide groups on germanium in place of chlorine.

(b) *Polycondensation:* Polycondensation of D. E. monomer (600 parts) was carried out at 280° C. without stabiliser using as catalyst 3.27 parts of the catalyst containing 2.05% germanium (i.e. 0.067 parts Ge). Polyester with intrinsic viscosity 0.7 and good colour but containing black catalyst granules was obtained in 1½ hours. The granules was filtered from the molten PET at 280° by a porosity 1 glass sinter leaving polymer of good colour containing no residual germanium and of i.v. 0.68.

EXAMPLE 5

(a) *Catalyst Preparation:* Manosil (20 parts, size 15–20 millimicrons) was dried by heating to 300° for 1½ hours with a nitrogen purge. After heating to 700° for further 1½ hours, the powder was quickly quenched in germanium tetrachloride. After pumping off excess GeCl₄ at room temperature, the solid was refluxed for 2 hours with ethylene glycol (250 parts). The solid was dried after filtering excess ethylene glycol, and was found to contain 13.3% germanium.

(b) *Polycondensation:* Polycondensation was carried out using 600 parts D.E. monomer without stabiliser, using 0.125 parts of the above prepared catalyst. The reaction was carried out at 280° C. for 1½ hours in a steel autoclave. PET of intrinsic viscosity 0.75 and very good colour was obtained.

EXAMPLE 6

(a) *Catalyst Preparation:* 26 gms. of "Manosil" (15–20 m$\mu$ size) was heated at 300° C. for 2 hours under vacuum.

84.8 parts of a toluene solution of titanium tetrachloride (containing 1.523 parts titanium tetrachloride) was introduced into a round-bottom glass flask, which was thoroughly purged with nitrogen. This solution was then diluted with 50 parts of anhydrous deoxygenated toluene.

The activated silica was poured, under nitrogen, into the titanium tetrachloride solution. The mixture was agitated and then purged with nitrogen overnight. 100 parts of deoxygenated ethanol was then added to the supported catalyst, and the mixture was stirred for 3 hours. The catalyst was then filtered off and washed with toluene, dried and then refluxed for 1 hour in distilled water. The product was filtered (after standing overnight in water), washed with distilled water and dried at 140° C. in vacuo for 4 hours.

The catalyst contained 1.93% Titanium.

(b) *Polycondensation:* D.E. Monomer (600 parts) was polycondensed with 1.245 parts of catalyst (=0.0050% ti based on DMT) to give fibre quality polyester of i.v.=0.72 in 1½ hours at 280° C. and 0.1 to 0.30 mm.

(a) *Catalyst Preparation:* 10 parts of ⅛" alumina Hg in a 1 lb. stainless steel autoclave.

EXAMPLE 7

(a) *Catalyst Preparation:* 10 parts of ⅛" alumina pellets were heated at 500° C. for 1½ hours in a stream of nitrogen. Titanium tetrachloride vapour was passed over the pellets for 2 hours at 300° C. and then the pellets were purged with a stream of nitrogen overnight allowing the temperature to fall to 25°. The pellets were then refluxed for 2 hours in 200 parts of deoxygenated ethanol, under nitrogen, the liquor decanted off and then the process repeated. Finally the pellets were refluxed in 200 parts of distilled water for 2 hours, filtered washed with distilled water and dried at 140° C. under vacuum. Analysis indicated 0.87% titanium.

(b) *Polycondensation:* 1 part of the pellets were refluxed in 50 parts of ethylene glycol for 2½ hours, under nitrogen, the glycol decanted off and the "wet" pellets used as a polycondensation catalyst. Good quality polyester was obtained in glass equipment, and the pellets could be filtered from the polyester with ease.

(A) *Catalyst Preparation:* This procedure will be described in three parts.

1. Activation of the support material,
2. Reaction with the metallic species,
3. Post-reaction treatment of catalyst.

1. Activation of support material 1.a. Silica (15–20 millimicron particles size "Manosil" grade VN3) was heated at 200° C. for 2 hours, (at 0.1 mm. pressure) then cooled under nitrogen. The activated material was subsequently stored under nitrogen.

1.b. Silica (295–500 micron particle size) was heated under nitrogen at one atmosphere for 3 hours at 400° C. The product was cooled under nitrogen, or used *in situ* in the next part of the process.

1.c. Aluminum oxide powders were heated for 2 hours under nitrogen at 500° C. then cooled under nitrogen.

1.d. Zirconium oxide powder was treated as aluminium oxide, but at 300° C.

1.e. Alumina pellets (3.2 mm. grade 000–3P from Ketjens, Amsterdam) were prepared as in (c) above.

1.f. Magnesium oxide powder was treated as aluminum oxide, but at 300° C.

2. Reaction with metal compounds 2.a. *Vapour phase reaction:* Volatile metal compounds, such as titanium tetrachloride may be reacted with the hydroxylic support in this way. Nitrogen is bubbled through the volatile liquid metal halide and the vapour passed on to the support material which is heated to a temperature indicated in the specific examples, for 2–3 hours. After cooling under nitrogen the product is solvent treated as described below.

2.b. *Liquid phase reaction:* The activated support was covered with anhydrous deoxygenated solvent and then the support was treated by either of the following two methods:

(i) When a metal alkenyl or aryl was used, e.g. titanium tetrabenzyl, the support was cooled to −30° C. and then treated with the organometallic compound. A solution of the organometallic complex was added, in accordance with the number of functional —OH groups on the support, until an excess was present. The mixture was then stirred for 15 minutes and then the supernatent liquid was removed.

(ii) If a metal halide was used, this was dissolved in the required deoxygenated solvent e.g. toluene, and then heated to reflux temperature under nitrogen for 2–3 hours with the support material.

2.c. *Immersion Method:* The support was activated as previously described and heated at 300–700° C. when it was quickly transferred, under nitrogen, into metal halide or alkoxide solution at room temperature. The excess metal compound was removed by washing or vacuum filtration.

3. Post-reaction treatment of catalyst

After reaction with the metal compound, the supported catalyst was washed with an inert solvent to remove any unreacted metallic species. The supported catalyst was then treated with a hydroxylic solvent, at reflux temperature for 2–3 hours under nitrogen. Several solvents were used in succession in some Examples.

Reference letters used are as follows:

Water: w
Ethylene glycol: g
Ethanol: e

The catalyst was then dried at 200° C. and stored under nitrogen until required.

(B) *Poly-condensation (PC):* Poly-condensation of the bis(ethylene glycol) ester of terephthalic acid (500 parts by weight) was carried out in a glass lined autoclave fitted with a stirrer, heater and ports for atmosphere control. The ester produced by direct esterification of terephthalic acid was introduced into the autoclave and heated; Poly-condensation was carried out at 285° C. and heated. Poly-condensation was carried out at 285° C. and 0.5 mm. Hg pressure for about 1 to 2 hours. In some runs 0.5% by weight titanium dioxide was added as a delustrant.

The product polymer was collected, filtered from the catalyst and intrisinc viscosities (I.V.) were determined for a 1% by weight solution in redistilled °-chlorophenol at 25° C.

The Results are summarised in the following Table:

| Example No. | Support and method of activation | Metal compound and method of reaction | Post grafting treatment of catalyst | Percent weight metal in catalyst | Amount of catalyst used (parts) | P/C time (mins.) | I.V. |
|---|---|---|---|---|---|---|---|
| 8 | 1.a | $TiCl_4$, 2.a at 300° | e g | 1.44 | 2.8 | 80 | 0.65 |
| 9 | 1.b | $TiCl_4$, 2.a at 400° | e g e | 0.34 | 3.8 | 90 | 0.60 |
| 10 | 1.b | $Ge(OCH_2CH_2OH)_4$, 2.c at 700° | g | 0.67 | 10.0 | 90 | 0.63 |
| 11 | 1.b | $TiCl_4$, 2.b (ii) | e g w | 1.93 | 1.25 | 90 | 0.71 |
| 12 | 1.c | $Ti(p\text{-methyl benzyl})_4$, 2.b(i) | g e | 0.66 | 1.0 | 90 | 0.77 |
| 13 | 1.c | $GeCl_4$, 2.c at 400° | g | 5.84 | 1.15 | 90 | 0.65 |
| 14 | 1.c | $SnCl_4$, 2.b(ii) | w | 7.16 | 1.06 | 90 | 0.71 |
| 15 | 1.c | $SbCl_3$, 2.b (ii) | w | 11.99 | 2.00 | 90 | 0.61 |
| 16 | 1.d | $Ge(OCH_2CH_2OH)_4$, 2.c at 300° | g | 0.06 | 3.00 | 90 | 0.57 |
| 17 | 1.f | $TiCl_4$, 2.b (ii) | g | 2.27 | 1.4 | 90 | 0.62 |
| 18 | 1.f | $VCl_4$, 2.b (ii) | e g w | 1.25 | 2.9 | 90 | 0.60 |
| 19 | 1.e | $MgCl_2$, 2.b (ii) | w | 0.75 | 1.0 | 180 | 0.45 |
| 20 | 1.e | $ZnCl_2$, 2.b (ii) | w g | 1.05 | 1.0 | 180 | 0.43 |
| 21 | 1.e | $Zr(allyl)_4$, 2.b (i) | e | 1.60 | 1.0 | 180 | 0.48 |
| 22 | 1.e | $VOCl_3$, 2.c at 400° | e g | 1.18 | 1.0 | 180 | 0.46 |
| 23 | 1.e | $Nb(allyl)_4$, 2.b (ii) | e g w | 0.65 | 1.9 | 180 | 0.45 |
| 24 | 1.e | $CrCl_3$, 2.b (ii) | w g | 1.10 | 1.0 | 180 | 0.53 |
| 25 | 1.e | $MnCl_2$, 2.b (ii) | w | 0.63 | 1.0 | 180 | 0.52 |
| 26 | 1.e | $CoCl_2$, 2.b (ii) | e g w | 0.63 | 1.0 | 180 | 0.46 |
| 27 | 1.e | $Ni(allyl)_2$, 2.b (i) | g w | 0.27 | 1.0 | 180 | 0.47 |
| 28 | 1.e | $CeCl_3$, 2.b (ii) | w g | 0.04 | 1.0 | 180 | 0.38 |

What is claimed is:

1. In the process for the production of a polyester by polycondensation of a polycondensable material at least 85% by weight of which is a bis(dihydric alcohol) ester of an aromatic dicarboxylic acid in the presence of a catalyst, the improvement comprising using as said catalyst the product of reacting a substantially inert inorganic support material having surface hydroxyl groups selected from the group consisting of silica, alumina, magnesia, aluminosilicates, boron phosphate and zirconia with a hydrolyzable compound of a metal selected from the group consisting of magnesium, calcium, germanium, tin, antimony, zinc, cadmium, titanium, zirconium, vanadium, niobium, chromium, molybdenum, manganese, iron, cobalt, nickel, cerium, and lanthanum, said hydrolyzable compound being selected from the group consisting of halides, oxyhydrocarbyls and organo-metallic compounds of said metals.

2. The process as claimed in claim 1 wherein said support material is activated by heating at 200–700° C.

3. The process as claimed in claim 1 wherein said catalyst particles are filtered off from the polymer after the polycondensation is essentially complete.

4. The process as claimed in claim 3 wherein said catalyst contains alumina as support material and is in the form of particles or granules 0.5 to 50 mm. in diameter and said polycondensable material is circulated through or passed through or over said particles or granules during the polycondensation process.

5. The process as claimed in claim 1 in which said catalyst is contacted with a monohydric or dihydric alcohol or water before use in the polycondensation process.

References Cited

UNITED STATES PATENTS 3,674,747   7/1972   Schnegg et al. _____ 260—75

FOREIGN PATENTS 1,568,479   5/1969   France.
1,357,247   4/1964   France.
6,610,227   1/1967   Netherlands.

MELVIN GOLDSTEIN, Primary Examiner

U.S. Cl. X.R.

252—428, 430, 432, 441, 442, 449, 461, 463

PO-1050
(5/69)

UNITED STATES PATENT OFFICE
CERTIFICATE OF CORRECTION

Patent No. 3,817,931                    Dated: June 18, 1974

Inventor(s) Eric Howard Brooks and Arthur Morris

It is certified that error appears in the above-identified patent and that said Letters Patent are hereby corrected as shown below:

In the heading of the patent, add:

--Foreign Application Priority Data

January 20, 1971    Great Britain .... 2789/71--

Signed and sealed this 5th day of November 1974.

(SEAL)
Attest:

McCOY M. GIBSON JR.                    C. MARSHALL DANN
Attesting Officer                      Commissioner of Patents